United States Patent
Tschernatsch

[11] Patent Number: 5,370,490
[45] Date of Patent: Dec. 6, 1994

[54] CARGO PICKUP MEMBER FOR A CONTINUOUSLY OPERATING SHIP UNLOADER

[75] Inventor: Günther Tschernatsch, Schwabach, Germany

[73] Assignee: Man Gutehoffnungshutte Aktiengesellschaft, Oberhausen, Germany

[21] Appl. No.: 9,780

[22] Filed: Jan. 27, 1993

[30] Foreign Application Priority Data

Feb. 18, 1992 [DE] Germany ............... 4204251

[51] Int. Cl.$^5$ ............................ B65G 67/60
[52] U.S. Cl. ................ 414/140.7; 414/139.6; 198/507; 198/511; 198/518; 198/522
[58] Field of Search .......... 414/137.1, 140.7, 141.9, 414/139.6, 139.7; 198/507, 511, 518, 522

[56] References Cited

U.S. PATENT DOCUMENTS

| | | | |
|---|---|---|---|
| 1,101,438 | 6/1914 | Hildebrand | 198/511 |
| 3,497,054 | 2/1970 | Van Kleuner | 198/507 |
| 4,334,818 | 6/1982 | Tingskog | 414/141.9 |
| 4,443,148 | 4/1984 | Arnemann | 414/140.7 |
| 5,238,346 | 8/1993 | Grothoff | 414/140.7 |

FOREIGN PATENT DOCUMENTS

| | | | |
|---|---|---|---|
| 1084643 | 9/1957 | Germany | 198/511 |
| 4125109 | 7/1991 | Germany | |
| 4116467A1 | 11/1992 | Germany | |
| 3232 | 1/1981 | Japan | 198/507 |
| 264130 | 11/1987 | Japan | 414/140.7 |
| 495255 | 12/1975 | U.S.S.R. | 414/140.7 |
| 4996 | 8/1987 | WIPO | 414/140.7 |

*Primary Examiner*—Michael S. Huppert
*Assistant Examiner*—Gregory A. Morse
*Attorney, Agent, or Firm*—McGlew and Tuttle

[57] ABSTRACT

A cargo pick-up member for transferring bulk material into an elevator of an unloading trunk of a ship unloader includes a screw pipe, a cutter head connected to the screw pipe, and a coupling sleeve attached to the screw pipe. The coupling sleeve includes a pivoting drive for pivoting the coupling sleeve with respect to the screw pipe. A baffle plate is detachably connected to the rotatable coupling sleeve via a height adjustable mount. The baffle plate includes a semi-circular portion surrounding a part of the cutter head and two outer legs extending from the semi-circular portion opening in the shape of a V from ends of the semi-circular portion for accommodating bulk material.

7 Claims, 4 Drawing Sheets

CARGO PICKUP MEMBER FOR A CONTINUOUSLY OPERATING SHIP UNLOADER

FIELD OF THE INVENTION

The present invention pertains to a cargo pickup member with a screw conveyor attaching it in the upward direction and rotating around the vertical axis for transferring bulk material into the elevator of the unloading trunk of a ship unloader.

BACKGROUND OF THE INVENTION

Ship unloaders, at the lower end of which a cargo pickup member in the form of a digging head rotating around its vertical axis is located, are known from German Publication P 41 16 467.9 and P 41 25 109.1. This cargo pickup member transfers the bulk material radially in the inward direction onto a first elevator, which may be, e.g., a screw conveyor.

This screw conveyor consists of a preferably double-threaded screw and a pipe closely surrounding same. The bulk material penetrated into the screw threads is pressed against the inner wall of the pipe and pushed upward by the pitch of the screw.

Once the bulk material reaches an opening arranged at the top of the pipe, the bulk material leaves the screw through a transfer duct and enters the pickup area of the second elevator in the ship unloader trunk.

As long as bulk materials are present on the bilge of the ship in sufficient amount and at sufficient dumping height, the bulk material is continuously picked up by the cutter head of the screw conveyor, delivered upward by the screw within the screw pipe, and transferred through the transfer duct onto the second elevator in the ship unloader trunk. Near the end of the unloading process, shovel loaders or auxiliary staff with manual devices are used in order to remove residual cargo especially from the corners and to bring it into the area of the cargo pickup device.

The performance of these residual tasks is time-consuming and labor-intensive.

SUMMARY AND OBJECTS OF THE INVENTION

It is an object of the present invention to provide a device for collecting residual material on the ship's bilge within a cargo space in order to possibly ensure continuous flow of material, to considerably reduce the time needed for pickup of the residual material, and to reduce the expense for additional loading devices and staff.

According to the invention, a cargo pick-up member is provided with an upwardly attached screw conveyor rotating around a vertical axis. The screw conveyor transfers bulk material into an elevator of an unloading trunk of a ship unloader. The screw conveyor includes a screw pipe connected to a cutter head. A coupling sleeve equipped with a pivoting drive and toothed segment is attached to the screw pipe. A baffle plate is connected to the rotatable coupling sleeve by a first connection part, a connection plate and a second connection part wherein the connection plate connects the first and second connection parts. The second connection part is detachably attached to the rotatable coupling sleeve via a height adjustable mount. The baffle plate semi-circularly surrounds the cutter head of the screw conveyor and includes two outer legs that open in a V-shape for accommodating bulk material.

A baffle plate with a V-shaped opening toward the stationary screw pipe is arranged on the lower part of the screw conveyor in the area of the rotatable cargo pickup member or cutter head of the screw conveyor.

Near the end of the unloading process the baffle plate, which is open on one side and has the shape of a large shovel, the shovel not reaching the bilge, prevents the cutter head of the screw conveyor from only throwing away the bulk material and interrupting the flow of material, because the back-pressure due to the surrounding bulk material is missing when the depth of the bulk material is too low.

Due to the screw conveyor being equipped with a pivotable, V-shaped baffle plate arranged on a rotatable coupling sleeve, the residual bulk material on the bilge of the ship is gathered on the ship's bilge by the opening during the horizontal movement of the ship unloading trunk, collected in the area of the V-shaped structure, and picked up by the rotating cutter head of the screw conveyor. To scan the ship's bilge by the cargo pickup member of the ship unloading trunk, a height probe is arranged on the outer semicircle of the baffle plate in order to monitor the distance between the baffle plate and the ship's bilge and to keep it as small as possible.

Another advantageous embodiment of the screw conveyor can be obtained by providing the baffle plate, in its lower part, with a lower part made of an elastic material that is mounted height-adjustably by means of a loose slotted-hole screw connection and hereby automatically adapts the ship's bilge, rather than with sheet metal.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
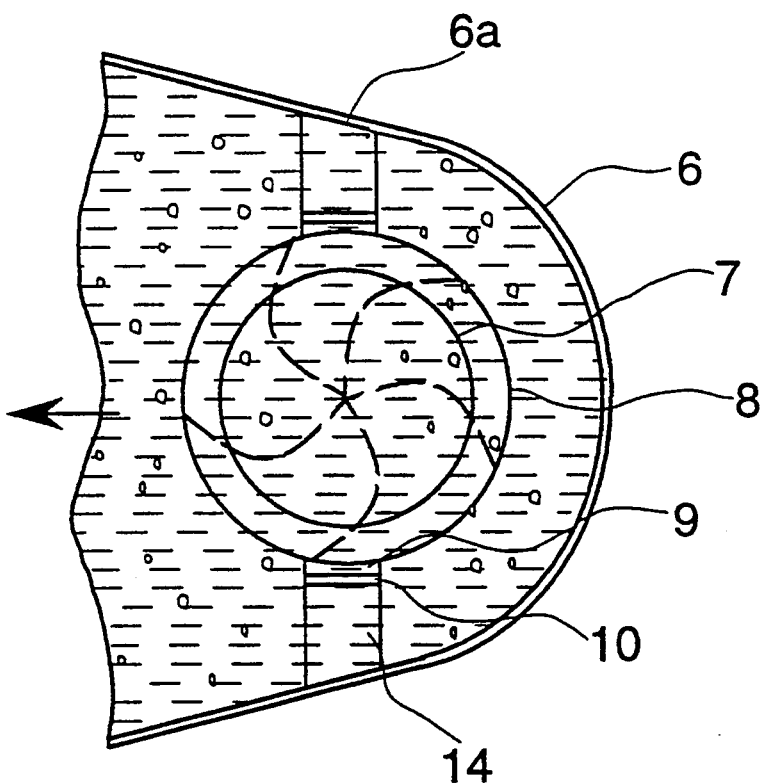
FIG. 1 is a top view of the lower part of the screw conveyor according to the invention.

FIG. 1 shows a top view of the arrangement of the baffle plate 6 on the screw pipe 7 of the screw conveyor 2, wherein one side of the baffle plate 6 is arranged semicircularly on the screw pipe 7, and the other side opens in the shape of a V and is limited by two legs 6a.

The baffle plate 6, 6a is connected on two sides to the screw pipe 7 by connection parts on the screw pipe 9, one connection plate 10 each, and one connection part each on the baffle plate 14.

Figure 2:
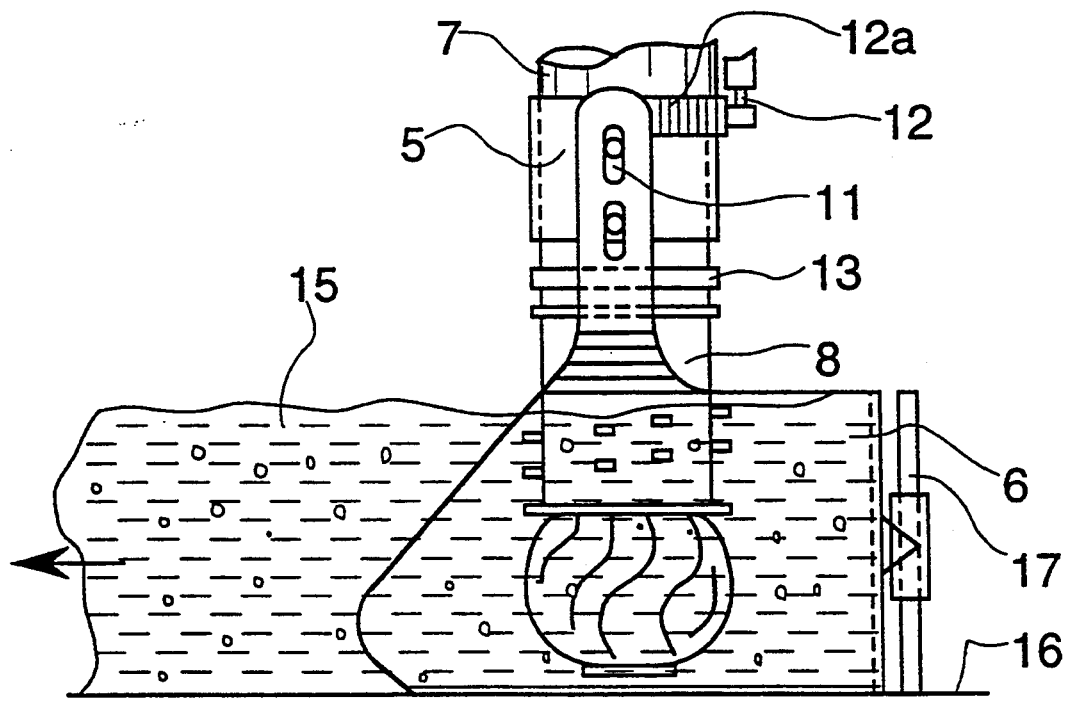
FIG. 2 is a side view of the lower part of the screw conveyor.

FIG. 2 shows a side view of the arrangement of the baffle plate 6 on the screw pipe 7, which is fastened rotatably and height-adjustably via a rotatable coupling sleeve 5 with pivoting drive 12 and via a displaceable mount 11.

Due to this arrangement, the rotatable cutter head 8 of the screw conveyor 2 is semicircularly surrounded by the baffle plate 6 under the closing flange 13, and continuous pickup of the material 15 to be delivered from the ship's bilge 16 is continued to be ensured near the end of the unloading process.

The ship's bilge 16 is scanned by a height probe 17, and the smallest possible distance between the lower edge of the baffle plate 6 and the ship's bilge 16, which is highly uneven in some areas, is thus set.

Figure 3:
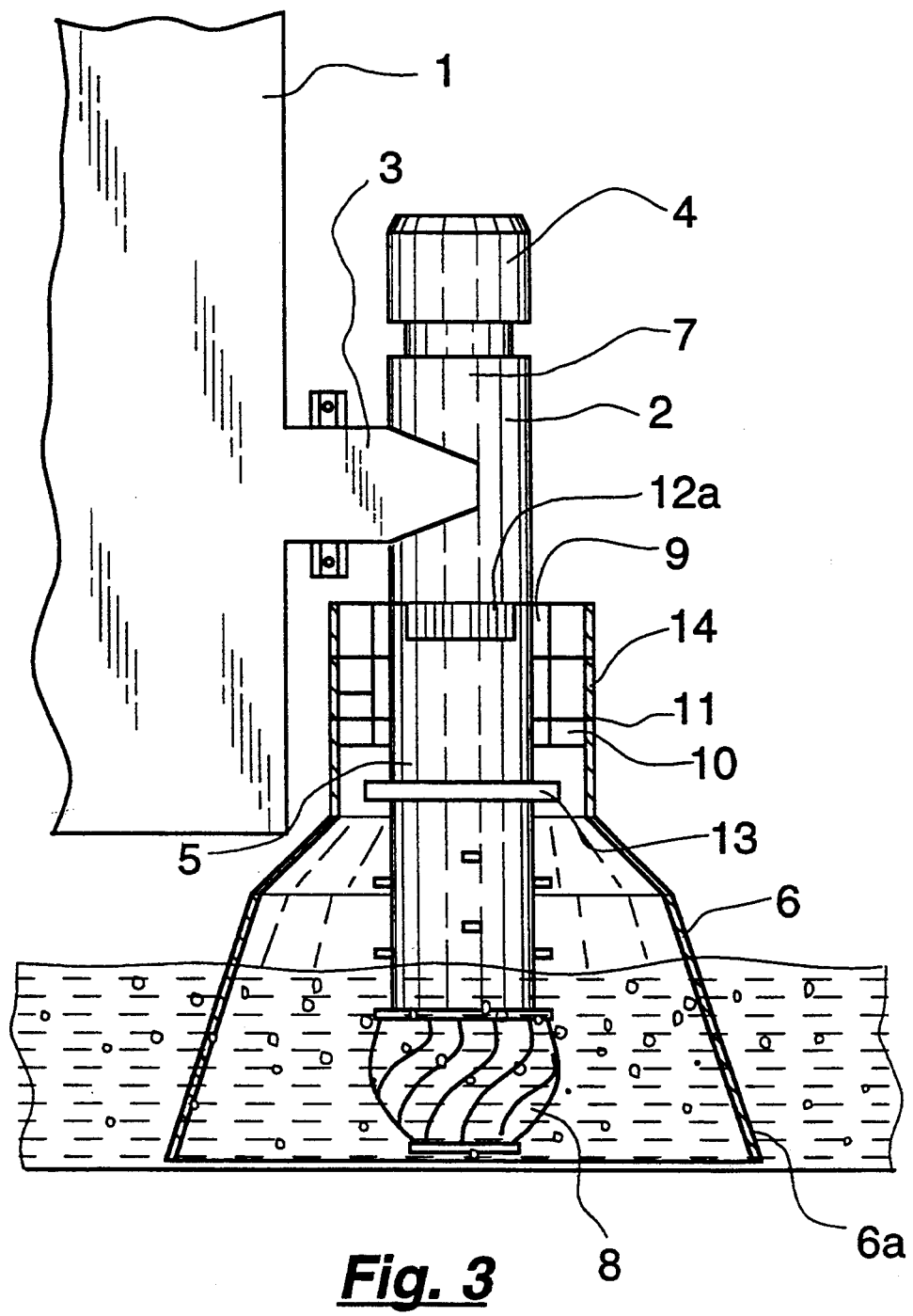
FIG. 3 is a side view of the lower part of the ship unloading trunk with the screw conveyor.

FIG. 3 shows the arrangement of the screw conveyor 2 with the cutter head 8 and the drive 4 on the ship unloading trunk with an elevator 1 and elevator transfer connection 3.

The baffle plate 6 is rotated via a toothed segment 12a attached to the rotary sleeve 5, with which the pivoting drive 12 shown in FIG. 2 is engaged, to position the baffle plate 6 as needed.

The baffle plate 6, which is represented as a V-shaped device with a right and left leg 6a here, is attached to the rotary sleeve 5 and consequently to the screw pipe 7 via different connection parts 9, 10, 14, as well as by means of a height-adjustable mount 11.

Figure 4:
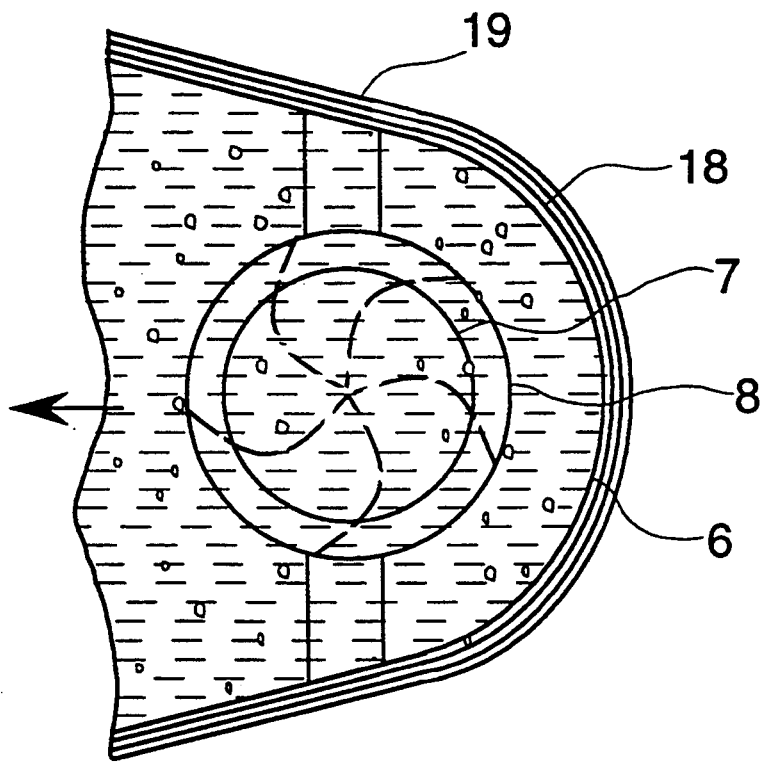
FIG. 4 is another top view of the lower part of the screw conveyor.
Figure 5:
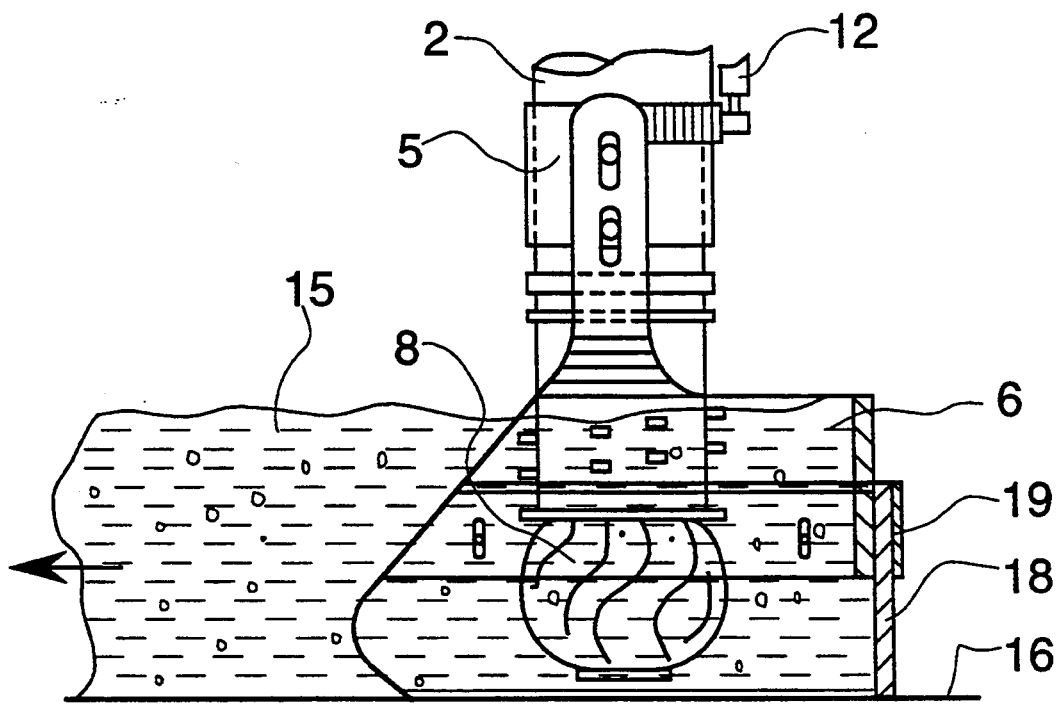
FIG. 5 is another side view of the lower part of the screw conveyor.
Figure 6:
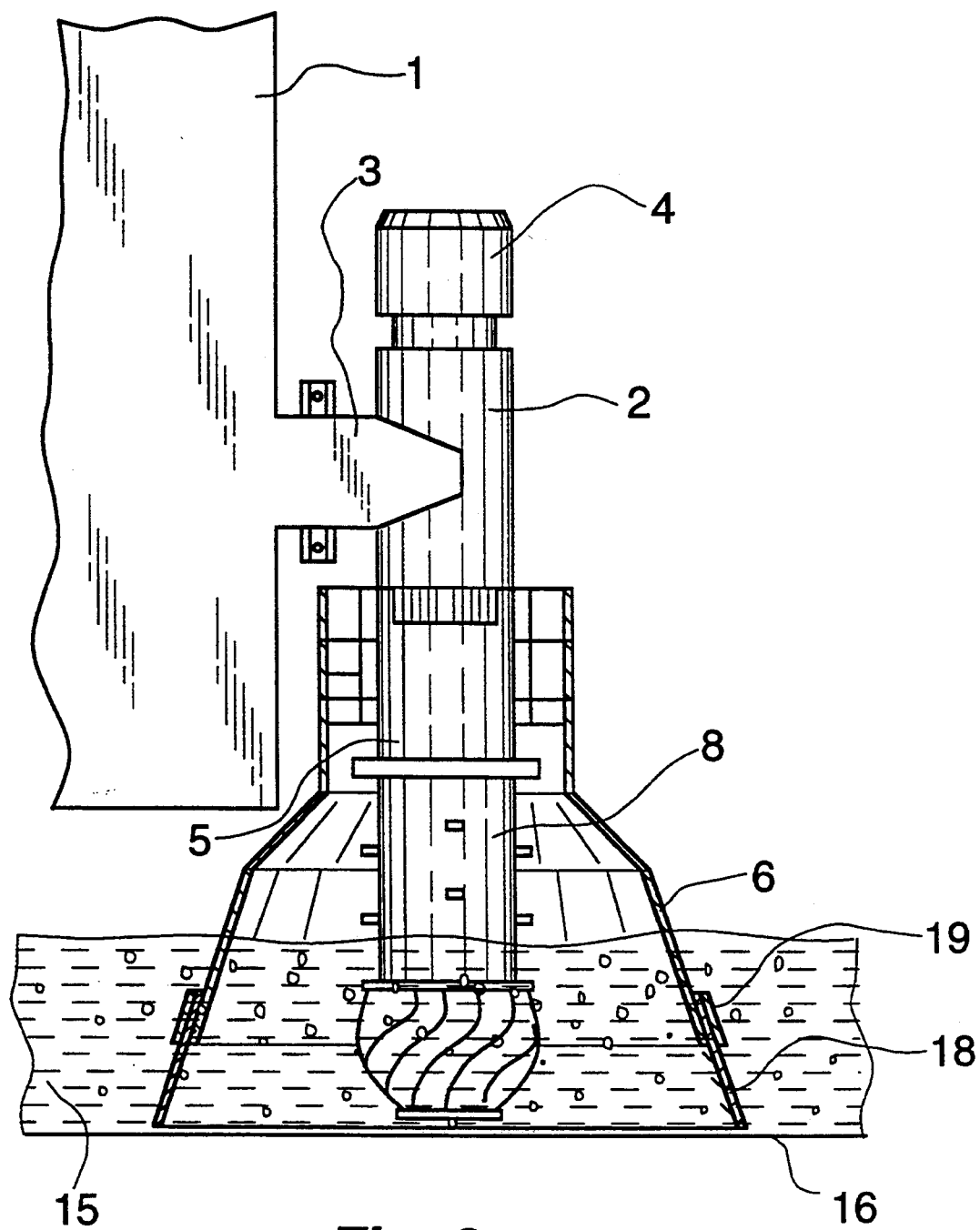
FIG. 6 is another side view of the lower part of the ship unloading trunk with the screw conveyor.

FIGS. 4–6 show another advantageous embodiment of the screw conveyor 2 with a the V-shaped baffle plate 6. In this variant, the baffle plate 6 is equipped, in the lower part, with a lower part 18 made of elastic material, which is attached by a loose slotted-hole screw connection 19 and therefore automatically adapts the ship's bilge 16 during the pickup of the material 15 to be delivered by the cutter head 8, rather than with sheet metal.

While specific embodiments of the invention have been shown and described in detail to illustrate the application of the principles of the invention, it will be understood that the invention may be embodied otherwise without departing from such principles.

What is claimed is:

1. A cargo pick-up member for transferring bulk material into an elevator of an unloading trunk of a ship unloader, comprising:
   a screw pipe having a central axis and extending in an axial direction;
   a cutter head connected to said screw pipe and rotatable with respect to said screw pipe;
   a coupling sleeve attached to said screw pipe;
   a pivoting drive means connected to said screw pipe and connected to said coupling sleeve for pivoting movement of said coupling sleeve to angular positions about a periphery of said screw pipe, independently of rotation of said cutter head;
   baffle plate means including a baffle plate detachably connected to said coupling sleeve for positioning of said baffle plate facing a pick-up direction corresponding to an angular position about said periphery of said screw pipe, said baffle plate including a semi-circular portion surrounding a part of said cutter head and two outer legs extending from said semi-circular portion and diverging in the shape of a V from ends of said semi-circular portion for defining an opening, opposite said semi-circular portion, for accommodating bulk material, said baffle plate means being movable toward the bulk material in said pick-up direction without rotation of said baffle plate such that said baffle plate accumulates material for removal by said cutter head; and
   height adjustable mounting means connecting said baffle plate detachably to said coupling sleeve for movement of said baffle plate in said axial direction with respect to said coupling sleeve.

2. Cargo pick-up member according to claim 1, further comprising:
   a height probe arranged connected to said baffle plate for monitoring a distance between a ship's bilge and a lower edge of said baffle plate.

3. A cargo pick-up member according to claim 1, wherein:
   said baffle plate includes a lower part formed of elastic material, said baffle plate including a loose slotted-hole screw connection allowing said lower part to slide relative to a remaining part of said baffle plate, above said ship's bilge.

4. A cargo pick-up member for transferring bulk material into an elevator of an unloading trunk of a ship unloader, comprising:
   a screw conveyor including a screw pipe with a central axis and a cutter head, said cutter head rotating with respect to said screw pipe about said central axis;
   a pivotable coupling sleeve attached to said screw pipe for pivotable movement to an angular position corresponding to a pick-up direction of the cargo pick-up member relative to said screw pipe, central axis pivotable movement of said coupling sleeve being independent of rotation of said cutter head;
   pivot drive means including a toothed segment for driving said coupling sleeve in rotation relative to said screw pipe;
   a baffle plate including an inner connection plate surrounding said coupling sleeve and an outer connection plate and a connection part connecting said inner connection plate and said outer connection plate, said baffle plate being attached to said rotatable coupling sleeve via a height adjustable mount, said baffle plate including a semi-circular portion partially surrounding said cutter head and two outer legs extending from ends of said semi-circular portion, said legs diverging in the shape of a V for defining an opening there between accommodating bulk material, said baffle plate being movable toward the bulk material in said pick-up direction without rotation of said baffle plate such that said baffle plate accumulates material for removal by said cutter head.

5. A cargo pick-up member according to claim 4, further comprising:
   height probe connected to said baffle plate for monitoring a distance between a ship's bilge and a lower edge of said baffle plate.

6. A cargo pick-up member according to claim 4, wherein:
   said baffle plate includes a lower part formed of a elastic material, said lower part being connected to a remaining portion of said baffle plate via a loose slotted-hole screw connection, thereby allowing said lower part to slide immediately above said ship's bilge, relative to the remaining part of said baffle plate.

7. A cargo pick-up member for transferring bulk material into an elevator of an unloading trunk of a ship unloader, comprising:
- a screw pipe having a central axis;
- a cutter head connected to said screw pipe and rotatable about said screw pipe central axis;
- a coupling sleeve attached to said screw pipe;
- a pivoting drive means connected to said screw pipe and connected to said coupling sleeve for pivotal movement of said coupling sleeve to any angular position with respect to said screw pipe central axis, said pivotal movement being independent of rotation of said cutter head;
- a baffle plate detachably connected to said coupling sleeve for positioning of said baffle plate in a pick-up direction corresponding to an angular position about said periphery of said screw pipe, said baffle plate including a semi-circular portion surrounding a part of said cutter head and two outer legs extending from said semi-circular portion and diverging in the shape of a V from ends of said semi-circular portion for providing an area free of said baffle plate defining a pick-up opening opposite said semi-circular portion and between said ends for accommodating bulk material, said baffle plate means being movable toward the bulk material in said pick-up direction without rotation of said baffle plate such that said baffle plate accumulates material for removal by said cutter head; and
- height adjustable mounting means connecting said baffle plate detachably to said coupling sleeve for axially movement of said baffle plate with respect to said coupling sleeve, with respect to said screw pipe and with respect to said cutter head.

* * * * *